United States Patent [19]

Costantini

[11] Patent Number: 4,694,394
[45] Date of Patent: Sep. 15, 1987

[54] MICROPROCESSOR SYSTEM HAVING A MULTIPLEXED ADDRESS/DATA BUS WHICH COMMUNICATES WITH A PLURALITY OF MEMORY AND INPUT/OUTPUT DEVICES INCLUDING TTL OUTPUT GATES

[75] Inventor: Giorgio Costantini, Milan, Italy

[73] Assignee: Honeywell Information Systems Italia, Milan, Italy

[21] Appl. No.: 786,376

[22] Filed: Oct. 10, 1985

[30] Foreign Application Priority Data

Dec. 12, 1984 [IT] Italy ............................... 24021 A/84

[51] Int. Cl.⁴ .............................................. G06F 13/00
[52] U.S. Cl. .................................................... 364/200
[58] Field of Search ... 364/200 MS File, 900 MS File

[56] References Cited
U.S. PATENT DOCUMENTS 4,349,870 9/1982 Shaw et al. ........................ 364/200
4,433,413 2/1984 Fasang ............................... 364/900

Primary Examiner—Eddie P. Chan
Attorney, Agent, or Firm—John S. Solakian; Nicholas Prasinos

[57] ABSTRACT

A microprocessor system is disclosed wherein a microprocessor has a multiplexed address/data bus which communicates with a plurality of memory and input-/output devices. A demultiplexing register permits the demultiplexing of the microprocessor address/data bus, while a decoder permits the selection of one of the system devices during a microprocessor external operation in response to the most significant address bits. The system output devices comprise a plurality of TTL outputs whose inputs are connected to the output of a demultiplexing register where, during a microprocessor external operation, information representative of the less significant address portion is latched. Datum information transfer to an output TTL gate is obtained by having an external operation executed by the microprocessor so that the most significant address bits select the gate and the less significant address portion represents the datum to be transferred.

3 Claims, 1 Drawing Figure

MICROPROCESSOR SYSTEM HAVING A MULTIPLEXED ADDRESS/DATA BUS WHICH COMMUNICATES WITH A PLURALITY OF MEMORY AND INPUT/OUTPUT DEVICES INCLUDING TTL OUTPUT GATES

BACKGROUND OF THE INVENTION

1. Field of the Invention

The present invention relates to a microprocessor system and, more particularly, to a microprocessor system having a multiplexed address/data bus which is provided with a plurality of output TTL gates.

2. Description of the Prior Art

Several microprocessors may present a multiplexed address/data bus to reduce the total number of external connecting pins. During an external operation performed by such microprocessors (for example, a memory access or an input/output operation) both addresses and data are present, during different times of the machine cycle, on the channel or multiplexed bus. The selection between the two kinds of information is performed by the use of suitable control signals supplied by the microprocessors. The only restraint for using a microprocessor with a multiplexed bus is the demultiplexing process of the bus in order to enable it to interface with standard memory circuits. Demultiplexing is generally accomplished by means of a register which latches the information representative of an address in response to a suitable microprocessor control signal—at a predetermined latching time of the cycle. During the remainder of the machine cycle the address/data bus changes to a data bus. Microprocessors, that are implemented with MOS (Metal-Oxide-Semiconductor) technology, provide a limited capacity of static load (fan out) to their own bus lines. The output logic gate coupled to each of said lines can, in fact, output only a small amount of current. If the line is overcharged it can be damaged by overheating and it may work incorrectly. (Most of the microprocessor manufacturers point out the maximum static load of the bus lines.) Typical static load features consists of a single TTL load. Generally such load features can be absorbed for microprocessor systems implemented on a single plate where the microprocessor is directly interconnected through the data bus and the address bus to memories and peripherals of its own MOS family. However, in systems where the microprocessor has to drive several TTL inputs the fan-out of the microprocessor bus lines must be increased by the insertion of additional drivers between bus lines and TTL loads. The present invention avoids the insertion of any drivers on a data bus of this type.

SUMMARY OF THE INVENTION

According to the present invention, the inputs of the output TTL gates are not directly connected to the lines of the multiplexed address/data bus but to the outputs of the demultiplexing register. It, therefore, acts as a driver for the system of TTL output gates. As the information present on the outputs of the demultiplexing register formally stands for addresses, the microprocessor task is to treat such information as data to be transferred to a preestablished output TTL gate. This is accomplished by mapping the output TTL gates as memory and accessing one of such gates by a fictitious memory access operation.

BRIEF DECRIPTION OF THE DRAWING

These and other features of the invention will become apparent from the following description of a preferred embodiment of the present invenion and from the enclosed drawing where:

FIG. 1 shows a microprocessor system having a multiplexed address/data bus.

DESCRIPTION OF A PREFERRED EMBODIMENT

Figure 1:
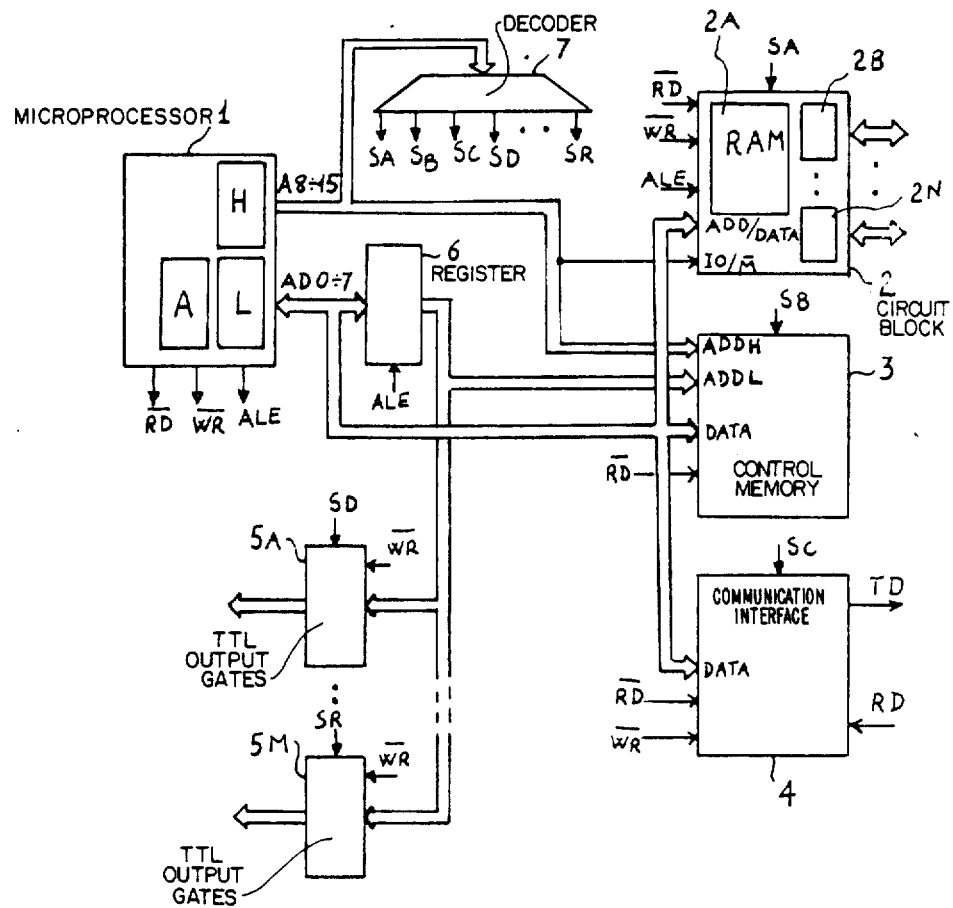

The microprocessor system of FIG. 1, which may be embodied on a single board, may be, for example, the control circuitry of a dot matrix printer. It is comprised of a microprocessor 1, typically microprocessor 8085 manufactured by INTEL and by circuit block 2 comprising a read/write working memory RAM 2A and a plurality of programmable input/output gates 2B, . . . , 2N. Block 2 can be implemented with one or more integrated circuits manufactured by INTEL identified as code 8155 and being of the same logic family as microprocessor 8085. For sake of simplicity, during the present description, the assumption will be made that circuit block 2 is comprised of a single circuit 8155; a read only control memory 3 which contains the control programs which can be executed by microprocessor 1; control memory 3 which can be typically implemented with one or more integrated circuits manufactured by INTEL and having codes 8316 or 2716 and being from the same logic family as that of microprocessor 8085. For sake of simplicity in describing the invention, a further assumption is made that the control memory is comprised of only one of these circuits; i.e., a data communication interface 4 designated to serially receive and transfer data on terminals RD or TD respectively. Interface 4 can be implemented with an integrated circuit manufactured by INTEL and having code number 8251 and being from the same logic family as that of microprocessor 8085; a plurality of TTL output gates 5A, . . . , 5M typically implemented with integrated circuits manufactured by TEXAS INSTRUMENTS and having code 74LS377; a demultiplexing register 6 typically implemented with an integrated circuit manufactured by TEXAS INSTRUMENTS and having code number 74LS373; a decoder 7 designated to select the suitable system unit to/from which microprocessor transfers/receives information. Decoder 7 can be typically implemented with one or more integrated circuits with code number 8205 manufactured by INTEL.

Microprocessor 1 has 8 output lines A8÷A15 where the 8 most significant bits of the address are provided during an access operation to one of the units comprising the system. The 8 less significant bits of the address are provided on the bidirectional lines AD 0-7 at the beginning of the access operation. Control signal ALE, one of the outputs from microprocessor 1 indicates that the information present on lines AD 0÷7 is representative of the address bits A0÷7 when it is in the logic level 1 state. In a subsequent phase of the access operation to one of the system units, when signal ALE is at logic level 0, it indicates that the information present is representative of the datum received or transferred by the microprocessor. Output signal $\overline{RD}$ ($\overline{WR}$) from microprocessor 1 indicates that the datum is to be received (transferred) by the microprocessor when at logic level 0. A predetermined number of address lines A8÷15 are connected to the inputs of decoder 7 (typically lines A11÷15 if the assumption is made to map the memory space available according to 2K location blocks). Decoder 7 provides a plurality of output signals $S_A$, $S_B$, ... $S_R$, intended to select the system unit to (from) which the microprocessor wants to transfer (receive) information. Address/data lines AD 0-7 are connected to the inputs of register 6 which receives a signal ALE on its control input terminal. When ALE rises to logic level 1, register 6 latches the information present at its input terminals (i.e., information representative of address bits A0-A7 thus making it available on its output terminals. Register 6 outputs are connected to the inputs of output gates 5A, ..., 5M, and to the inputs ADDL of the less significant address bits of control memory 3. Besides, input terminals ADDH receiving the most significant bits of memory 3, they are also connected to a suitable number of address lines A8÷A15. Microprocessor pins AD0-7 are further connected to the multiplexed pins ADD/DATA of circuit block 2 and to pins DATA of both control memory 3 and of communication interface 4. Since such units belong to the same logic family of microprocessor 1, they can be controlled by microprocessor 1 without driving problems. Signal ALE, in addition to enabling the input of register 6, is also applied to a suitable control input of circuit block 2 and provides the latching of information present on pins ADD/DATA in a demultiplexing register internal to circuit 2, when this circuit is selected. Circuit 2 further receives suitable information signals, for example address bit A8, on a control input 10/M. When such information signals are at logic level 0 (1), it indicates that the unit involved in the data transfer with microprocessor 1 is memory RAM 2A (one of the gates 2B, ..., 2N). Output signals $\overline{RD}$, $\overline{WR}$ from microprocessor 2 are applied to two control input terminals of circuit block 2 and communication interface 4. Since $\overline{RD}$ is further applied to a control input of control memory 3 and signal $\overline{WR}$ to the timing inputs of output gates 5A, ... 5M.

It can now be shown how microprocessor 1 loads a datum into one of the output gates 5A ... 5M. This is possible by having a memory write operation executed by microprocessor 1 into a location whose address portion A8÷A15 selects the desired output gate and whose address portion A0÷A7 is representative of the datum to be transferred to such gates. With reference to microprocessor 8085, to obtain such result immediately the microprocessor has to perform, for example, a microinstruction "STA addr" (storing of the accumulator content into the memory location "addr") where the value of the two bytes comprising the address information "addr" is given in accordance to the above-mentioned criterion. It is also possible to transfer the content of any of the microprocessor registers to a pre-established output gate. However, in this case, before the processor can execute the fictitious memory access operation, it must transfer both the information selecting the output gate and the content of its internal register containing the datum to its internal address register. For example, with reference to microprocessor 8085 again, a simple routine to transfer the content of accumulator A to an output gate having address XX, is as follows:

MVI H, XX; transfer of address XX to a register H internal to microprocessor 8085

MOV L, A; transfer of accumulator A content to a register internal to the microprocessor MOV M, A; transfer of the accumulator content to the memory location whose address is contained into register H (most significant address byte A8÷A15) and L (less significant address byte A÷A7).

It is apparent that with this simple routine the information contained into accumulator A, which must be transferred to an output gate, is first transferred to internal register L generally devoted to store an address portion and, with the final microinstruction MOV M, A, such information is loaded into register 6 and then transferred to the output gate which is selected according to the content of register H. The information appearing on pins AD0-7 in a second phase of instruction MOV M, A is not important for the transfer and it is actually ignored by the selected output gate and by the other system components.

It is apparent that several modifications can be made to the disclosed microprocessor system without departing from the scope of the present invention.

What is claimed is:

1. A microprocessor system comprising:
   a microprocessor having a first group of address lines internally connected to the output of a first address register H, a second group of multiplexed address-/data lines internally and selectively connected to the output of a second address register L or of an accumulator and a plurality of control lines;
   a demultiplexing register having inputs connected to said second group or multiplexed address/data lines and one of said control lines;
   a control memory having address inputs connected to the outputs of said demultiplexing register and to at least one line of said first group, having information outputs connected to said second group of lines, and a selection input;
   a plurality of TTL output gates provided with data inputs, one enabling input and control input connected to another one of said control lines;
   a decoder having inputs connected to a subset of lines of said first group and a plurality of outputs, each of them respectively connected to the selection input of said control memory and enabling input of said TTL output gates; and
   a direct connection between the outputs of said demuliplexing register and the data inputs of said TTL output gates.

2. A microprocessor system as per claim 1 characterised in that said address register L, intended to contain an address portion, is loaded with information to be transferred to one of said TTL output gates.

3. The system of claim 1 further comprising:
   means for loading said address register H with an information selecting an output gate;
   means for loading said address register L with the information to be transferred;
   means, included in said microprocessor, for executing a fictitious memory transfer operation to the address specified by the content of said address register H and L.

* * * * *